(12) United States Patent
Wiedner et al.

(10) Patent No.: US 12,071,967 B2
(45) Date of Patent: Aug. 27, 2024

(54) FASTENER AND FASTENING ARRANGEMENT INCLUDING NUT WITH LOAD TRANSFER SHOULDER

(71) Applicant: Hilti Aktiengesellschaft, Schaan (LI)

(72) Inventors: Christoph Wiedner, Feldkirch (AT); Vincent De Groof, Frastanz (AT); Frederik Korte, Feldkirch (AT); Juergen Gebhard, Buchs (CH); Juergen Boeckle, Schaan (LI); Kay Heemann, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 424 days.

(21) Appl. No.: 17/598,047

(22) PCT Filed: Mar. 17, 2020

(86) PCT No.: PCT/EP2020/057223
§ 371 (c)(1),
(2) Date: Sep. 24, 2021

(87) PCT Pub. No.: WO2020/193272
PCT Pub. Date: Oct. 1, 2020

(65) Prior Publication Data
US 2022/0170496 A1   Jun. 2, 2022

(30) Foreign Application Priority Data

Mar. 27, 2019 (EP) ..................................... 19165463

(51) Int. Cl.
*F16B 13/06* (2006.01)
*F16B 13/08* (2006.01)

(52) U.S. Cl.
CPC ........ *F16B 13/065* (2013.01); *F16B 13/0875* (2013.01)

(58) Field of Classification Search
CPC ............................... F16B 13/065; F16B 43/02
(Continued)

(56) References Cited

U.S. PATENT DOCUMENTS 2,381,110 A * 8/1945 Chandler ................ F16B 39/36
411/937
3,090,203 A * 5/1963 Durget .................... E21D 21/00
405/259.4
(Continued)

FOREIGN PATENT DOCUMENTS

EP  2 287 475 A2   2/2011
JP  57139710 U     9/1982

OTHER PUBLICATIONS

PCT/EP2020/057223, International Search Report dated Jun. 3, 2020 (Three (3) pages).
(Continued)

*Primary Examiner* — Gary W Estremsky
(74) *Attorney, Agent, or Firm* — Crowell & Moring LLP

(57) ABSTRACT

A fastener includes an anchor bolt and a nut. The nut has a nut hole and an internal thread. The anchor bolt has an anchor portion and a threaded rod that has an external thread and that is connected to the anchor portion. The nut is arranged on the threaded rod and the internal thread of the nut threadedly engages the external thread of the threaded rod. The nut has a rearward nut section, a forward nut section, and an outside shoulder for load transfer into the nut which is located between the forward nut section and the rearward nut section and which faces the anchor portion of the anchor bolt. The internal thread of the nut extends at least in the forward nut section and threadedly engages the external thread of the threaded rod at least in the forward nut section.

16 Claims, 2 Drawing Sheets

(58) Field of Classification Search
USPC .......................................... 411/44, 266, 280
See application file for complete search history.

(56) References Cited

U.S. PATENT DOCUMENTS

| | | | | |
|---|---|---|---|---|
| 4,314,784 | A * | 2/1982 | Tausig | F16B 13/065 411/60.1 |
| 5,263,803 | A * | 11/1993 | Anquetin | F16B 13/00 411/65 |
| 5,727,355 | A * | 3/1998 | Mitchell | E04F 13/0816 411/63 |
| 5,885,034 | A * | 3/1999 | Fergusson | F16B 31/028 411/10 |
| 6,860,688 | B2 * | 3/2005 | Bushell | F16B 39/105 411/196 |
| 10,202,999 | B2 * | 2/2019 | Steinberg | E04B 1/388 |
| 2008/0085169 | A1 * | 4/2008 | Gruen | F16B 13/141 411/386 |
| 2012/0230799 | A1 * | 9/2012 | Wiedner | F16B 37/08 411/305 |
| 2013/0014376 | A1 * | 1/2013 | Komsitsky | F16B 5/0208 29/525.02 |
| 2014/0017028 | A1 | 1/2014 | McKinlay | |
| 2014/0050550 | A1 * | 2/2014 | Stempniewski | F16B 13/141 411/360 |
| 2018/0117374 | A1 * | 5/2018 | Pascoe | A62B 35/04 |

OTHER PUBLICATIONS

Stanley, "Spiralock Load Distribution", URL:https://www.stanleyengineeredfastening.com/product-brands/spiralock/load-distribution, Mar. 22, 2019, pp. 1-2.

* cited by examiner

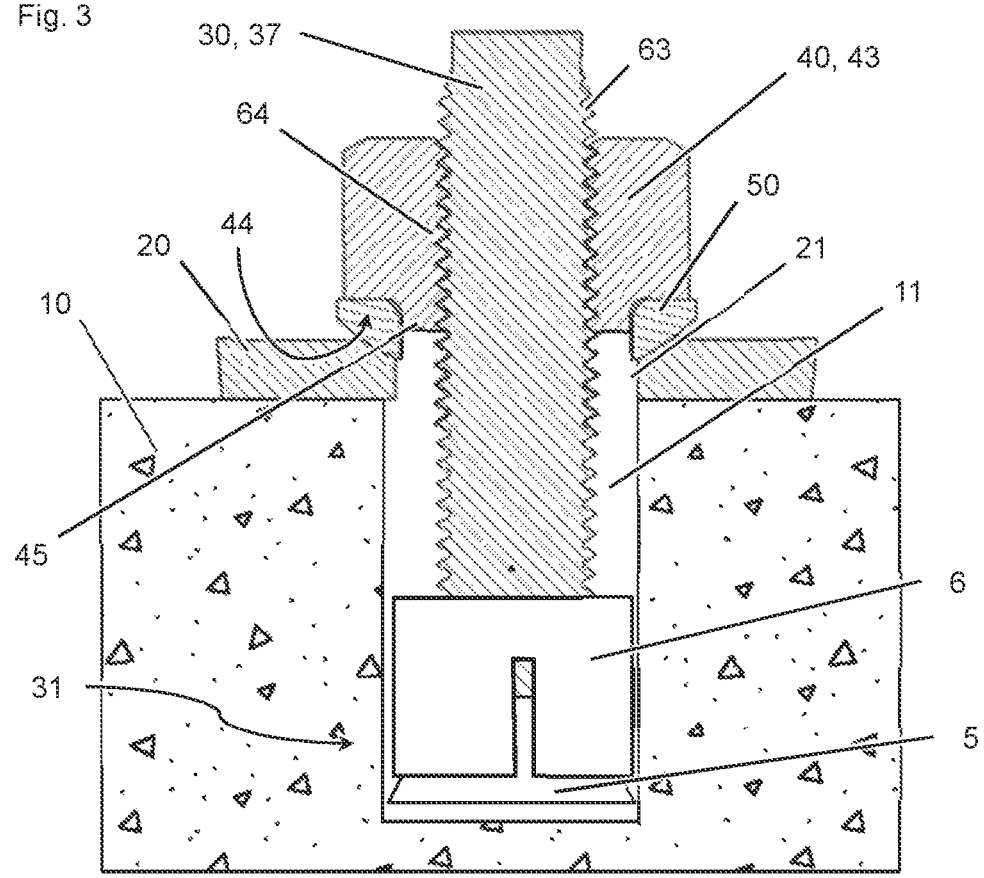

FASTENER AND FASTENING ARRANGEMENT INCLUDING NUT WITH LOAD TRANSFER SHOULDER

BACKGROUND AND SUMMARY OF THE INVENTION

The invention relates to a fastener comprising an anchor bolt and a nut, wherein the nut has a nut hole and an internal thread projecting into the nut hole, wherein the anchor bolt has an anchor portion and a threaded rod that has an external thread and that is connected to the anchor portion to transfer tensile force into the anchor portion, and wherein the nut is arranged on the threaded rod and the internal thread of the nut threadedly engages the external thread of the threaded rod. The invention further relates to a fastening arrangement.

Anchors, such as expansion anchors or chemically fixed anchors, can be used to transfer static as well as non-static (e.g., dynamic or cyclic) loads. When transferring dynamic tension loads, the failure mode of the anchor bolt can be fatigue cracking of the threaded rod of the anchor bolt, in particular in that region of the threaded rod which is engaged by the nut.

At https://www.stanleyengineeredfastening.com/product-brands/spiralock/load-distribution, the so-called "Spiralock" concept is described. According to this concept, the shape of the nut's internal thread is designed in such a way that only the crest regions of the threaded rod's external thread get in contact with the nut's internal thread. This is intended to smoothen load transfer from the nut to the bolt and to increase fatigue performance.

Moreover, so-called castellated nuts are known. These nuts have a castellated top which is provided with slots. The castellated nuts are intended to be used with pins that fit through the slots and through a hole in the threaded rod to which the nut is attached, thereby preventing the nut from becoming loose.

It is an object of the invention to provide a fastener and a fastening arrangement including such a fastener having, whilst being particularly easy and reliable to manufacture, particularly good performance, in particular in dynamic load situations.

An inventive fastener is characterized in that the nut comprises a rearward nut section, a forward nut section located closer to the anchor portion of the anchor bolt than the rearward nut section, and an outside shoulder for load transfer into the nut, which is located between, in particular located axially between, the forward nut section and the rearward nut section and which faces the anchor portion of the anchor bolt, wherein the internal thread of the nut extends at least in the forward nut section and the internal thread of the nut threadedly engages the external thread of the threaded rod at least in the forward nut section.

According to the invention, the nut has, for load transfer to an attachment part, a shoulder that is located axially in the middle region of the nut.

In connection with the invention it was found that, when a standard nut is used and load transfer from the attachment part to the nut thus takes place via the face of the nut facing the attachment part, a pronounced stress maximum might arise, namely at the foremost first turn of the threaded rod's external thread that is engaged in the nut. This is since the stress which is present at an individual thread turn of the threaded rod is correlated to the sum of the stress transferred through that thread turn, plus the stress resulting from total bolt tension (which is the sum of the load increments transferred into the threaded rod at the remaining turns). In the foremost engaged turn, both parameters are highest: Since the foremost engaged turn is closest to the location where the load is transferred from the attachment part into the nut, i.e., since it is closest to the forward face of the nut, stress increment transferred through that thread turn is highest. And total bolt tension is also highest since all remaining engaged thread turns contribute to the total bolt tension at the foremost engaged turn. Additional loading of the foremost engaged thread turn might occur since the internal thread of the nut is under compression and the threaded rod's external thread is under tension, so that slight elastic pitch mismatch can occur when loaded, which mechanism again increases surface pressure and load transfer particularly in the foremost engaged turn, since the foremost turn is that location where highest compression stress in the nut and the highest tension stress in the threaded rod are present. The resulting local stress maximum, located at the first engaged thread turn, can promote starting and propagation of a fatigue crack, potentially resulting in performance reduction of the fastener, in particular in dynamic load situations.

In the light of these findings, the invention provides the load transfer between the attachment part and the nut at an interface shoulder which is located remote from the forward end of the nut, namely in the axial middle region of the nut. As a consequence, the thread turn which is closest to the location where the load is transferred from the attachment part into the nut, i.e., the turn which has to bear highest load increment, can be remote from the foremost engaged thread turn where total bolt tension is highest. Amongst other for this reason, an equalization of stresses present at the individual thread turns can be achieved in a partially easy manner, potentially leading to significant reduction of the stress peak in the highest loaded thread turn, which in term can lead to significantly increased fatigue performance, in particular in dynamic load situations.

The internal thread and/or the external thread is preferably continuous, in order to further equalize force transfer. The anchor portion and the threaded rod are so connected that tensile force, in particular directed in the pullout direction of the anchor bolt, can be transferred from the threaded rod into the anchor portion. Preferably, the threaded rod and at least parts of the anchor portion, in particular a wedge part of the anchor portion, can be integral. If the anchor bolt is a chemical anchor, the external thread can also extend into the anchor portion, i.e., the anchor portion can be formed by a subsection of the threaded rod. The anchor portion and the threaded rod can also be connected by an unthreaded rod section. It is particularly preferred that the threaded rod is a metal part, more particularly a steel part. The external thread winds around the threaded rod. The external thread can extend along the entire threaded rod or merely along a fraction thereof.

It is particularly preferred that the nut is a metal part, more particularly a steel part.

The forward nut section is located axially closer to the anchor portion than the rearward nut section, i.e., the forward nut section axially points to the anchor portion. Being an outside shoulder, the shoulder is located on the outside of the nut. In particular, the outside shoulder is for axial load transfer from the attachment part into the nut, i.e., for applying axial pressure on the attachment part, optionally via at least one washer located between the attachment part and the nut. The outside shoulder faces the anchor portion of the anchor bolt, i.e., it is oriented toward the anchor portion, so that it can axially press against the attachment part located between the anchor portion and the outside shoulder.

The forward nut section and the rearward nut section are in particular axially offset.

The nut is screwingly arranged on the threaded rod. In particular, the nut hole and the threaded rod extend in the axial direction.

Where the terms "radially", "axially" or "circumferentially" are used, this should in particular be understood with respect to the longitudinal axis of the anchor rod, which is often also the longitudinal axis of the anchor bolt.

It is particularly preferred that the forward nut section is less rigid and/or has higher elastic flexibility than the rearward nut section. As a result of the load transfer to the attachment part being located axially in the middle of the nut, the nut has a section, namely the forward nut section, which is tensioned when the nut is tightened. According to the present preferred embodiment, this tensioned section is designed with reduced rigidity and/or increased elastic flexibility. This allows to further modify and to equalize load transfer to the threaded rod in a particular easy manner. In particular, it is possible to further unload the foremost engaged turns, and to additionally load the turns located in the middle or towards the rearward end of the nut, where the total stress is lower.

Advantageously, the forward nut section has, at least regionally, preferably throughout, smaller wall thickness and/or smaller outer diameter than the rearward nut section. This allows to decrease rigidity of the forward nut section in order to equalize thread load in a particularly easy manner. Additionally, providing the respective sections with different outer diameter can allow a particular easy and/or robust design, as the difference in outer diameters can create the outside shoulder.

The outside shoulder connects the forward nut section and the rearward nut section. It is particularly preferred if the forward nut section and the rearward nut section both adjoin the outside shoulder. According to this embodiment, there are no additional features between the rearward nut section and the outside shoulder or between the forward nut section and the outside shoulder, respectively. This allows obtaining a particularly compact, easy-to-manufacture and/or robust design.

It is also advantageous if the forward nut section is provided with at least one slot that extends from the free end of the forward nut section towards the outside shoulder. This also allows to decrease rigidity of the forward nut section in order to equalize thread load in a particularly easy manner. In particular, the at least one slot can extend axially, more preferably parallel to the axial direction.

The at least one slot preferentially terminates at a distance from the outside shoulder. This can reduce notch effects close to the load transferring outside shoulder, further improving load capacity.

It is particularly preferred if the forward nut section is provided with a plurality of slots that extend from the free end of the forward nut section towards the outside shoulder. If there is a plurality of slots, their constructional details are preferably as described here in connection with at the at least one slot. However, the constructional details of some of the slots may also differ. Preferentially, the plurality of slots are arranged equidistantly around at the circumference of the forward nut section.

The forward nut section is ring-shaped and surrounds the nut hole. Preferably, the rearward nut section is also, at least partly, ring-shaped and surrounds the nut hole. Thus, the nut hole extends at least through the forward nut section and, more preferably, the nut hole extends through the forward nut section and through the rearward nut section. This allows using the fastener in a particular versatile way. Preferably, the nut hole is a through hole.

According to another preferred embodiment of the invention, the internal thread of the nut extends in the forward nut section and in the rearward nut section and the internal thread of the nut threadedly engages the external thread of the threaded rod both in the forward nut section and in the rearward nut section. This allows to further equalize thread load in a particularly easy manner, in particular since additional thread turns can contribute to load transfer.

The outside shoulder is preferably ring-shaped, i.e., it forms in particular a structure encircling the nut and/or the nut hole. This can further equalize stresses and improve performance. The inner boundary of the ring-shaped outside shoulder, which is located adjacent to the forward nut section, is preferentially circular, and outer boundary of the ring-shaped outside shoulder, which is located adjacent to rearward nut section, is preferentially hexagonal. In particular, the outside shoulder surrounds the nut hole.

Advantageously, the rearward nut section is provided with spanner flats, preferably with six spanner flats. This permits particularly efficient torque transfer into the nut.

The lateral surface of the forward nut section is preferably cylindrical, with an annular base. It can also be cone-shaped, converging towards the forward end of the nut, wherein the cone shape can be applied in order to reduce rigidity.

The nut hole preferentially has constant diameter both in the forward nut section and in the rearward nut section, wherein the diameter of the nut hole in the forward nut section and in the rearward nut section is the same. This can further simplify design and/or improve performance.

The anchor bolt can preferably be an expansion anchor, in particular a wedge anchor or a sleeve anchor. In these cases, the anchor portion can comprise a wedge mechanism. The anchor bolt can also be a chemical anchor, which is intended to be anchored in a chemical manner. In this case, the anchor portion can be intended to be embedded in a grout shell located within a substrate hole and the anchor portion can have structures for engaging the grout shell.

In the anchor portion, the anchor bolt preferably has at least one wedge part that converges towards the rear of the anchor bolt. This can provide a wedge mechanism for particularly efficient anchoring, both in the case of mechanical anchor bolts and in the case of chemical anchor bolts. The wedge part can for example be an expansion cone.

The invention also relates to a fastening arrangement comprising a substrate having a substrate hole, and an attachment part having an attachment part hole, wherein the fastening arrangement further comprises a fastener as described here, wherein the anchor bolt extends in the substrate hole and in the attachment part hole, wherein the anchor portion of the anchor bolt is anchored at the substrate, and wherein the outside shoulder of the nut rests against the attachment part. Accordingly, the fastener is installed as intended.

In particular, the forward nut section points to the substrate and/or it is closer to the substrate than the rearward nut section. The nut surrounds the threaded anchor rod and secures the attachment part on the threaded anchor rod. The substrate is preferably a concrete substrate or a masonry substrate. The attachment part can be, for example, a plate or a bracket. Preferably, the attachment part is a metal part, in particular a steel part. The substrate hole can be a through hole or a blind hole. The attachment part hole is a through hole. The substrate hole and the attachment part hole are aligned, so that the anchor bolt can be positioned within both holes simultaneously. In particular, the anchor portion is anchored against being pulled out of substrate hole in the pullout direction, the pullout direction pointing from the substrate hole to the attachment part hole.

The outside shoulder can directly rest on the attachment part, or it can rest against the attachment part via at least on washer. It is particularly preferred that the fastening arrangement comprises at least one spherical washer which is located between the nut and the attachment part and which surrounds the anchor bolt, wherein the outside shoulder rests against the attachment part via the spherical washer. Being a spherical washer, it has a convex levelling surface, which levelling surface in particular faces the attachment part. A spherical washer can allow compensation of misalignment, thereby avoiding bending stresses caused by misalignment, and further equalizing stress in the turns of the engaged threads. If a spherical washer is used, there can be at least one intermediate washer placed between the spherical washer and the outside shoulder of the nut or between the spherical washer and the attachment part.

According to another preferred embodiment of the invention, the forward nut section and the attachment part hole are axially offset. Thus, the forward nut section does not project into the attachment part hole. This can prevent the forward nut section from inadvertently hitting the attachment part, which could redistribute load transfer, in a particularly easy and reliable manner.

Features that are described here in connection with the inventive fastening arrangement can also be used in connection with the inventive fastener and features that are described here in connection with the inventive fastener can also be used in connection with the inventive fastening arrangement.

The invention is explained in greater detail below with reference to preferred exemplary embodiments, which are depicted schematically in the accompanying drawings, wherein individual features of the exemplary embodiments presented below can be implemented either individually or in any combination within the scope of the present invention.

BRIEF DESCRIPTION OF THE DRAWINGS

FIG. 3 is partial sectional view of a modified embodiment of a fastening arrangement including a fastener.

DETAILED DESCRIPTION OF THE DRAWINGS

Figure 1:
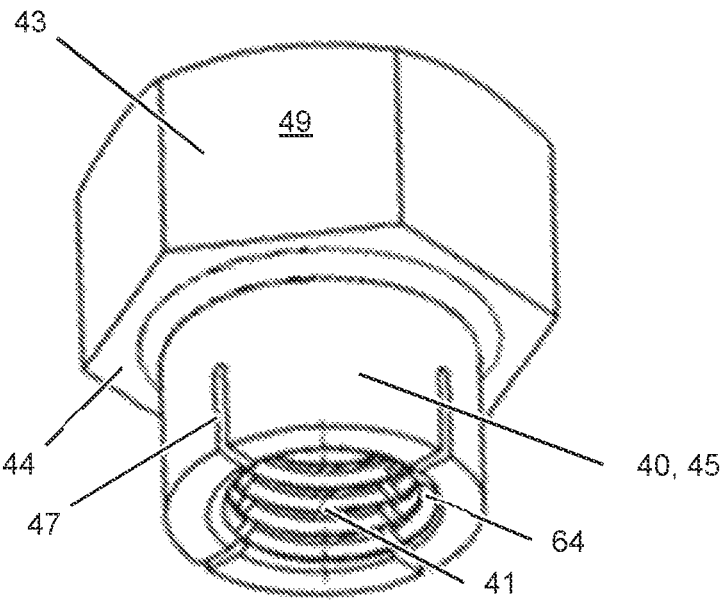
FIG. 1 is a partial sectional view of an embodiment of a fastening arrangement including a fastener.
Figure 2:
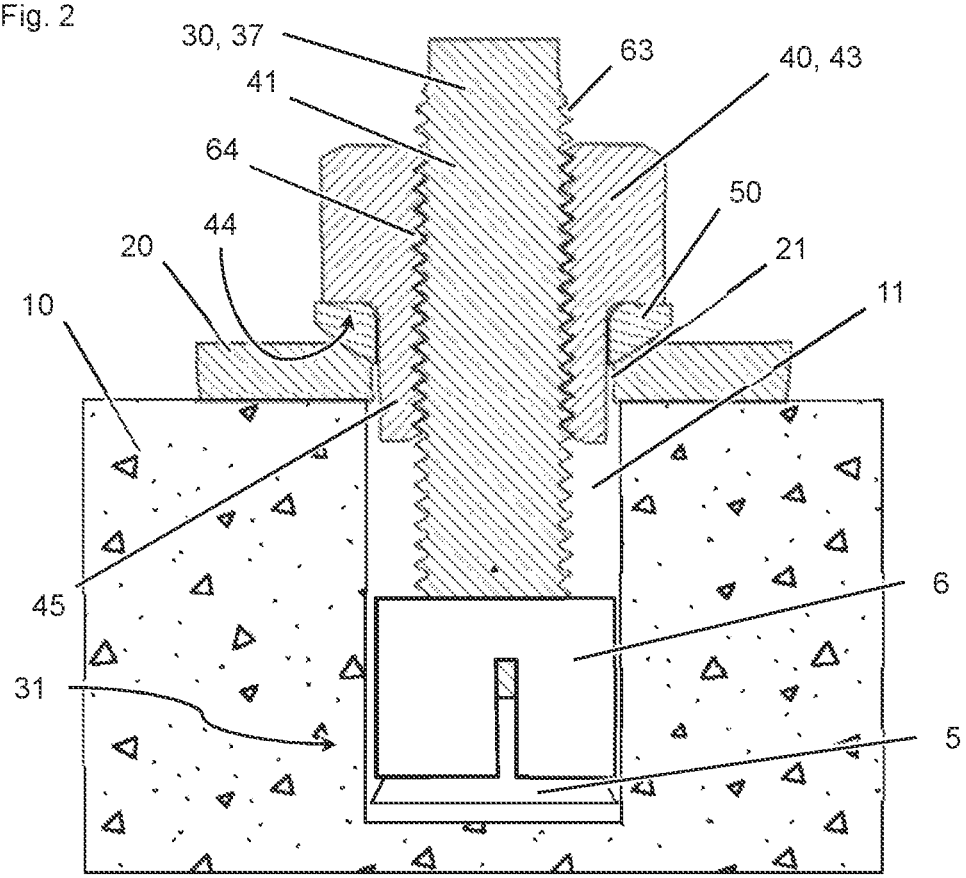
FIG. 2 is a perspective view of the nut of the fastener of FIG. 1.

An example of a fastening arrangement including a fastener is shown in FIGS. 1 and 2. The fastening arrangement comprises a substrate 10, preferably a concrete substrate or a masonry substrate, an attachment part 20, in particular a metal attachment part, for example a support foot or a bracket, resting against the substrate 10, and the fastener, securing the attachment part 20 to the substrate 10.

The substrate 10 has a substrate hole 11, which is a blind hole in the present case, but which could also be through hole. The attachment part 20 has an attachment part hole 21, which is a through hole and which overlaps the substrate hole 11.

The fastener comprises an anchor bolt 30 that is located in the substrate hole 11 and in the attachment part hole 21. The anchor bolt 30 comprises an anchor portion 31, which is anchored at the substrate 10, in particular within the substrate hole 11. The anchor bolt 30 also comprises a threaded rod 37, which is connected to the anchor portion 31 so as to transfer tensile force from the threaded rod 37 to the anchor portion 31. The threaded rod 37 is provided with an external thread 63, which spirals around the threaded rod 37. In the present embodiment, the anchor bolt 30 is an expansion anchor. Thus, the anchor portion 31 comprises at least one wedge part 5, which is an expansion cone in the shown embodiment, and at least one expandable part 6, which is an expansion sleeve in the shown embodiment. The wedge part 5 radially loads the expandable part 6 when the wedge part 5 is axially loaded, thereby anchoring the anchor portion 31. However, the anchor bolt 30 being an expansion anchor is an example only. The anchor bolt 30 could, for example, also be a chemical anchor.

The fastener furthermore comprises a nut 40 with an axially extending nut hole 41 extending through the nut 40. The nut 40 has an internal thread 64, which projects into the nut hole 41, and which corresponds to the external thread 63 of the threaded rod 37. The threaded rod 37 is arranged in the nut hole 41, and the internal thread 64 of the nut 40 threadedly engages the external thread 63 of the threaded rod 37. The nut 40 axially abuts against the attachment part 20, in particular via a washer 50, thereby positive-locking the attachment part 20 to the anchor bolt 30 and securing the attachment part 20 on the substrate 10.

The nut 40 comprises two sections, namely a rearward nut section 43 and a forward nut section 45, wherein the rearward nut section 43 and the forward nut section 45 are axially offset. The rearward nut section 43 has larger outer diameter than the forward nut section 45, and a forwardly facing, outside shoulder 44 is formed between the forward nut section 45 and the rearward nut section 43. The outside shoulder 44 delimits the forward nut section 45 at its rearward end and the rearward nut section 43 at its forward end. The outside shoulder 44 is ring-shaped and faces forwards, i.e., it faces the anchor portion 31. Preferably, at least parts of the outside shoulder 44 extend in transverse plane of the anchor bolt 30.

The rearward nut section 43 has six spanner flats 49, forming a hexagonal cylinder on the lateral surface of the rearward nut section 43. The lateral surface of the forward nut section 45 essentially has the shape of a circular cylinder. However, the lateral surface of the forward nut section 45 could also have other shapes, such as a truncated conical shape.

The nut hole 41 extends, in particular with constant diameter, through both the forward nut section 45 and the rearward nut section 43. The internal thread 64 also extends along both the forward nut section 45 and the rearward nut section 43.

Slots 47 are provided in the forward nut section 45, which originate at the free, forward end of the forward nut section 45, which extend towards the rearward nut section 43 and towards the outside shoulder 44, and which terminate at a distance from the outside shoulder 44. These slots 47, which connect the outside lateral surface of the forward nut section 45 with the nut hole 41, reduce the rigidity of the forward nut section 45.

Abutment of the nut 40 against the attachment part 20 (via washer 50) takes place at the outside shoulder 44, and not at the forwards free end of the nut 40. Thus, tension is transferred to the nut 40 remote from the forwards free end of the nut 40, which can equalize load transfer and avoid load peaks at the threads 63, 64.

As already mentioned, the fastener comprises a washer 50 surrounding the threaded rod 37 at an axial position between the anchor portion 31 and the nut 40. In the shown fastening arrangement, the nut 40 thus abuts against the attachment part 20 via the washer 50. By way of example, the shown washer 50 is a spherical washer having a convex levelling surface facing the attachment part 20. This provides a levelling function in case of slight misalignment. However, the washer 50 is optional. In particular, it can also be envisaged that the nut 40 directly abuts against the attachment part 20.

FIG. 3 shows a modification of the embodiment shown in FIGS. 1 and 2. In the embodiment of FIG. 3, the forward nut section 45 extends merely into the washer 50, but not into the attachment part 20. In other words, the forward nut section 45 and the attachment part hole 21 are axially offset, which can be useful in order to avoid unwanted load bypass between the forward nut section 45 and the attachment part 20. Apart from that, the embodiment of FIGS. 1 and 2 and that of FIG. 3 are the same, and reference is therefore made to the description of the embodiment of FIGS. 1 and 2, which applies mutatis mutandis to that of FIG. 3.

The invention claimed is:

1. A fastener, comprising:
   an anchor bolt (30); and
   a nut (40);
   wherein the nut (40) has a nut hole (41) and an internal thread (64) projecting into the nut hole (41);
   wherein the anchor bolt (30) has an anchor portion (31) and a threaded rod (37) that has an external thread (63) and that is connected to the anchor portion (31) to transfer a tensile force into the anchor portion (31);
   wherein the nut (40) is arranged on the threaded rod (37) and the internal thread (64) of the nut (40) threadedly engages the external thread (63) of the threaded rod (37);
   wherein the nut (40) comprises a rearward nut section (43), a forward nut section (45) which is located closer to the anchor portion (31) of the anchor bolt (30) than the rearward nut section (43), and an outside shoulder (44) for load transfer into the nut (40) which is located between the forward nut section (45) and the rearward nut section (43) and which faces the anchor portion (31) of the anchor bolt (30);
   wherein the internal thread (64) of the nut (40) extends at least in the forward nut section (45) and the internal thread (64) of the nut (40) threadedly engages the external thread (63) of the threaded rod (37) at least in the forward nut section (45);
   wherein the forward nut section (45) defines at least one slot (47) that extends from a free end of the forward nut section (45) towards the outside shoulder (44).

2. The fastener according to claim 1, wherein the forward nut section (45) is less rigid than the rearward nut section (43).

3. The fastener according to claim 1, wherein the forward nut section (45) has at least in a region a smaller wall thickness and/or a smaller outer diameter than the rearward nut section (43).

4. The fastener according to claim 1, wherein the forward nut section (45) and the rearward nut section (43) both adjoin the outside shoulder (44).

5. The fastener according to claim 1, wherein the at least one slot (47) terminates at a distance from the outside shoulder (44).

6. The fastener according to claim 1, wherein the nut hole (41) extends through the forward nut section (45) and through the rearward nut section (43).

7. The fastener according to claim 1, wherein the internal thread (64) of the nut (40) extends in the forward nut section (45) and in the rearward nut section (43) and the internal thread (64) of the nut (40) threadedly engages the external thread (63) of the threaded rod (37) both in the forward nut section (45) and in the rearward nut section (43).

8. The fastener according to claim 1, wherein the outside shoulder (44) is ring-shaped.

9. The fastener according to claim 1, wherein the rearward nut section (43) has a plurality of spanner flats (49).

10. The fastener according to claim 1, wherein a lateral surface of the forward nut section (45) is cylindrical with an annular base, wherein the nut hole (41) has a constant diameter both in the forward nut section (45) and in the rearward nut section (43), and wherein the diameter of the nut hole (41) in the forward nut section (45) and in the rearward nut section (43) is the same.

11. The fastener according to claim 1, wherein the anchor bolt (30) is a wedge anchor.

12. A fastening arrangement, comprising:
   a substrate (10) having a substrate hole (11);
   an attachment part (20) having an attachment part hole (21); and
   the fastener according to claim 1;
   wherein the anchor bolt (30) extends in the substrate hole (11) and in the attachment part hole (21);
   wherein the anchor portion (31) of the anchor bolt (30) is anchored at the substrate (10);
   wherein the outside shoulder (44) of the nut (40) rests against the attachment part (20).

13. The fastening arrangement according to claim 12, further comprising at least one spherical washer (50) which is located between the nut (40) and the attachment part (20) and which surrounds the anchor bolt (30), wherein the outside shoulder (44) rests against the attachment part (20) via the at least one spherical washer (50).

14. A fastening arrangement, comprising:
   a substrate (10) having a substrate hole (11);
   an attachment part (20) having an attachment part hole (21); and
   a fastener, wherein the fastener comprises:
      an anchor bolt (30); and
      a nut (40);
      wherein the nut (40) has a nut hole (41) and an internal thread (64) projecting into the nut hole (41);
      wherein the anchor bolt (30) has an anchor portion (31) and a threaded rod (37) that has an external thread (63) and that is connected to the anchor portion (31) to transfer a tensile force into the anchor portion (31);
      wherein the nut (40) is arranged on the threaded rod (37) and the internal thread (64) of the nut (40) threadedly engages the external thread (63) of the threaded rod (37);
      wherein the nut (40) comprises a rearward nut section (43), a forward nut section (45) which is located closer to the anchor portion (31) of the anchor bolt (30) than the rearward nut section (43), and an outside shoulder (44) for load transfer into the nut (40) which is located between the forward nut section (45) and the rearward nut section (43) and which faces the anchor portion (31) of the anchor bolt (30);
      wherein the internal thread (64) of the nut (40) extends at least in the forward nut section (45) and the internal thread (64) of the nut (40) threadedly engages the external thread (63) of the threaded rod (37) at least in the forward nut section (45);

wherein the anchor bolt (30) extends in the substrate hole (11) and in the attachment part hole (21);
wherein the anchor portion (31) of the anchor bolt (30) is anchored at the substrate (10);
wherein the outside shoulder (44) of the nut (40) rests against the attachment part (20);
wherein the forward nut section (45) and the attachment part hole (21) are axially offset.

15. The fastening arrangement according to claim 14, wherein the forward nut section (45) defines at least one slot (47) that extends from a free end of the forward nut section (45) towards the outside shoulder (44).

16. The fastening arrangement according to claim 15, wherein the at least one slot (47) terminates at a distance from the outside shoulder (44).

* * * * *